United States Patent
Karaoguz et al.

(10) Patent No.: US 8,589,591 B2
(45) Date of Patent: Nov. 19, 2013

(54) CUSTOMIZED DELIVERY OF CONTENT BY A BROADBAND GATEWAY

(75) Inventors: Jeyhan Karaoguz, Irvine, CA (US); Xuemin (Sherman) Chen, San Diego, CA (US); Wael William Diab, San Francisco, CA (US); David Garrett, Tustin, CA (US); David Lundgren, Mill Valley, CA (US); Rich Prodan, Niwot, CO (US)

(73) Assignee: Boadcom Corporation, Irvine, CA (US)

( * ) Notice: Subject to any disclaimer, the term of this patent is extended or adjusted under 35 U.S.C. 154(b) by 244 days.

(21) Appl. No.: 12/982,429

(22) Filed: Dec. 30, 2010

(65) Prior Publication Data

US 2011/0302324 A1    Dec. 8, 2011

Related U.S. Application Data

(60) Provisional application No. 61/351,696, filed on Jun. 4, 2010.

(51) Int. Cl.
*G06F 15/16* (2006.01)

(52) U.S. Cl.
USPC .......................................... 709/246; 709/247

(58) Field of Classification Search
USPC ................................................. 709/246, 247
See application file for complete search history.

(56) References Cited

U.S. PATENT DOCUMENTS

| | | | |
|---|---|---|---|
| 2002/0143972 A1* | 10/2002 | Christopoulos et al. | ...... 709/231 |
| 2003/0156543 A1 | 8/2003 | Sahinoglu et al. | |
| 2007/0206513 A1 | 9/2007 | Cho et al. | |
| 2008/0159304 A1 | 7/2008 | Ozugur et al. | |
| 2009/0027495 A1* | 1/2009 | Oskin et al. | ................... 348/143 |
| 2010/0184411 A1 | 7/2010 | Chen et al. | |
| 2010/0184414 A1 | 7/2010 | Abraham et al. | |
| 2010/0184450 A1 | 7/2010 | Chen et al. | |
| 2010/0186027 A1 | 7/2010 | Hou et al. | |
| 2010/0210239 A1 | 8/2010 | Karaoguz et al. | |
| 2010/0215029 A1 | 8/2010 | Karaoguz et al. | |
| 2010/0220692 A1 | 9/2010 | Diab et al. | |
| 2010/0220731 A1 | 9/2010 | Diab et al. | |

* cited by examiner

*Primary Examiner* — Mohamed Wasel
(74) *Attorney, Agent, or Firm* — Thomas|Horstemeyer, LLP.

(57) ABSTRACT

Aspects of customized delivery of content by a broadband gateway are provided. A broadband gateway may be operable to determine one or more characteristics of acquired content. The gateway may be operable to determine, based on the determined characteristics, whether the acquired content may be compatible with a device. In instances that the acquired content is not compatible with the device, the gateway may transcode the acquired content to make it compatible with the device. The one or more characteristics may comprise an identity or a type of a provider associated with the acquired content, a quality of the acquired content, power consumption associated with communicating the acquired content to a destination device, or power consumption associated with presenting or otherwise processing the acquired content on a destination device.

20 Claims, 8 Drawing Sheets

CUSTOMIZED DELIVERY OF CONTENT BY A BROADBAND GATEWAY

CLAIM OF PRIORITY

This patent application makes reference to, claims priority to and claims benefit from U.S. Provisional Patent Application Ser. No. 61/351,696 filed on Jun. 4, 2010.

The above stated application is hereby incorporated herein by reference in its entirety.

INCORPORATION BY REFERENCE

This patent application also makes reference to:
U.S. patent application Ser. No. 12/982,231 filed on Dec. 30, 2010;
U.S. patent application Ser. No. 12/982,355 filed on Dec. 30, 2010;
U.S. patent application Ser. No. 12/981,971 filed on Dec. 30, 2010;
U.S. patent application Ser. No. 12/981,993 filed on Dec. 30, 2010;
U.S. patent application Ser. No. 12/982,216 filed on Dec. 30, 2010;
U.S. patent application Ser. No. 12/982,433 filed on Dec. 30, 2010;
U.S. patent application Ser. No. 12/982,205 filed on Dec. 30, 2010;
U.S. patent application Ser. No. 12/982,353 filed on Dec. 30, 2010;
U.S. patent application Ser. No. 12/981,966 filed on Dec. 30, 2010;
U.S. patent application Ser. No. 12/982,453 filed on Dec. 30, 2010;
U.S. patent application Ser. No. 12/982,172 filed on Dec. 30, 2010;
U.S. patent application Ser. No. 12/981,990 filed on Dec. 30, 2010;
U.S. patent application Ser. No. 12/982,442 filed on Dec. 30, 2010;
U.S. patent application Ser. No. 12/982,000 filed on Dec. 30, 2010;
U.S. patent application Ser. No. 12/982,010 filed on Dec. 30, 2010;
U.S. patent application Ser. No. 12/982,022 filed on Dec. 30, 2010;
U.S. patent application Ser. No. 12/981,986 filed on Dec. 30, 2010;
U.S. patent application Ser. No. 12/982,236 filed on Dec. 30, 2010;
U.S. patent application Ser. No. 12/982,091 filed on Dec. 30, 2010;
U.S. patent application Ser. No. 12/982,213 filed on Dec. 30, 2010;
U.S. patent application Ser. No. 12/982,166 filed on Dec. 30, 2010;
U.S. patent application Ser. No. 12/982,340 filed on Dec. 30, 2010;
U.S. patent application Ser. No. 12/982,073 filed on Dec. 30, 2010;
U.S. patent application Ser. No. 12/982,501 filed on Dec. 30, 2010;
U.S. patent application Ser. No. 12/982,206 filed on Dec. 30, 2010;
U.S. patent application Ser. No. 12/982,440 filed on Dec. 30, 2010;
U.S. patent application Ser. No. 12/982,171 filed on Dec. 30, 2010;
U.S. patent application Ser. No. 12/982,223 filed on Dec. 30, 2010;
U.S. patent application Ser. No. 12/982,305 filed on Dec. 30, 2010;
U.S. patent application Ser. No. 12/982,477 filed on Dec. 30, 2010;
U.S. patent application Ser. No. 12/982,331 filed on Dec. 30, 2010;
U.S. patent application Ser. No. 12/982,036 filed on Dec. 30, 2010;
U.S. patent application Ser. No. 12/982,196 filed on Dec. 30, 2010;
U.S. patent application Ser. No. 12/982,391 filed on Dec. 30, 2010;
U.S. patent application Ser. No. 12/982,405 filed on Dec. 30, 2010;
U.S. patent application Ser. No. 12/981,753 filed on Dec. 30, 2010;
U.S. patent application Ser. No. 12/982,414 filed on Dec. 30, 2010;
U.S. patent application Ser. No. 12/981,733 filed on Dec. 30, 2010;
U.S. patent application Ser. No. 12/395,383 filed on Feb. 27, 2009;
U.S. patent application Ser. No. 12/355,537 filed on Feb. 27, 2009;
U.S. patent application Ser. No. 12/355,480 filed on Jan. 16, 2009;
U.S. patent application Ser. No. 12/372,648 filed on Feb. 17, 2009;
U.S. patent application Ser. No. 12/355,413 filed on Jan. 16, 2009, 2009;
U.S. patent application Ser. No. 12/355,377 filed on Jan. 16, 2009, 2009;
U.S. patent application Ser. No. 12/395,470 filed on Feb. 27, 2009; and
U.S. patent application Ser. No. 12/391,009 filed on Feb. 23, 2009;

Each of the above stated applications is hereby incorporated herein by reference in its entirety.

FIELD OF THE INVENTION

Certain embodiments of the invention relate to a broadband gateway. More specifically, certain embodiments of the invention relate to a method and system for customized delivery of content by a broadband gateway.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB communicatively coupled to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for customized delivery of content by a broadband gateway, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for customized delivery of content by a broadband gateway. In various embodiments of the invention, a broadband gateway may be operable to determine one or more characteristics of acquired content. The gateway may be operable to determine, based on the determined characteristics and based attributes of one or more electronic devices that will be utilized for consuming the content, whether the acquired content may be compatible with the one or more electronic devices. In instances that the acquired content is not compatible with the one or more electronic devices, the gateway may transcode the acquired content to make it compatible with the one or more electronic devices. The transcoding may comprise compressing the acquired content, decompressing the acquired content, and/or a combination of decompressing and compressing the acquired content. The transcoding may comprise scaling a resolution of the acquired content. The one or more characteristics may comprise an identity or a type of a provider associated with the acquired content, a quality of the acquired content, and/or power consumption associated with communicating the acquired content to a destination device, and/or power consumption associated with presenting or otherwise processing the acquired content on a destination device. The attributes may comprise a display resolution of the one or more devices, a decoding algorithm or technique supported by the one or more devices, and a bandwidth of a connection between the one or more devices and/or the broadband gateway.

The broadband gateway may be operable to determine, based on the determined characteristics, whether the acquired content is compatible with user-specified criteria. In instances that the acquired content is not compatible with the user-specified criteria, the gateway may be operable to transcode the acquired content to make it compatible with the user-specified criteria. The user-specified criteria may comprise one or more of: criteria for quality of the content and/or criteria for power consumption associated with communicating and consuming the content. The user-specified criteria may be stored in memory in the broadband gateway.

Figure 1:
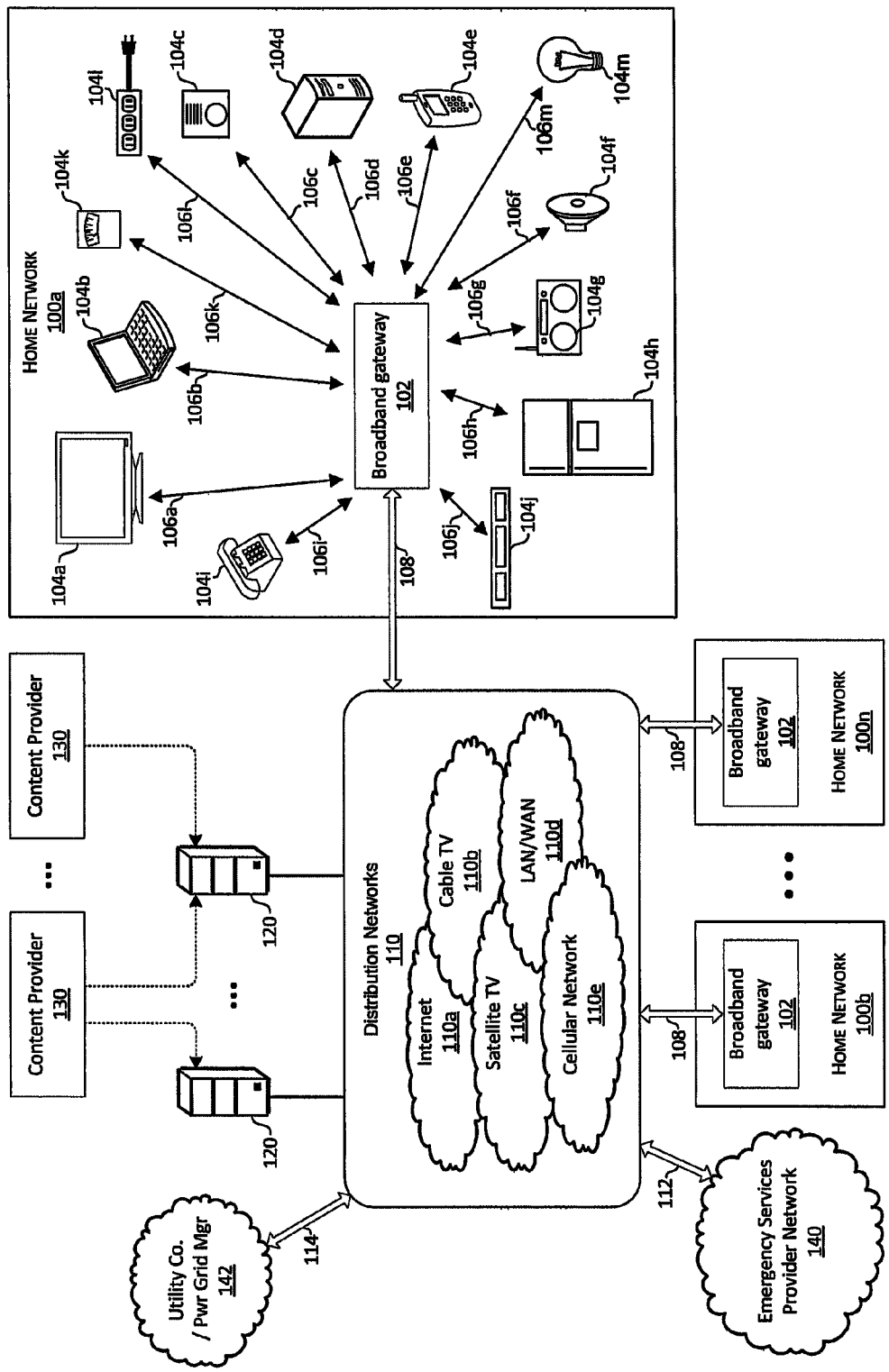
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100A may be serviced by a broadband gateway 102. Also shown in FIG. 1 are additional home networks 100b, . . . , 100n, an emergency services provider network 140, and a network of a power grid management entity 142. Each of the home networks 100b, . . . , 100n may also be serviced by a broadband gateway 102.

The service providers 120 may comprise various entities which may provide various services to the devices 104 via the gateway 102 and/or to the gateway 102 itself. Some of the service providers 120 may comprise network access service providers which provide physical layer connections to the gateway 102. Such physical layer connections may then be utilized to access, and/or may be part of, one or more of the distribution networks 110. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers.

The content providers 130 may generate, capture, and/or package content, such as multimedia content, that may be distributed to end-users. The content may comprise, for example, audio, video, e-book, gaming, and/or other content. The content may be, for example, downloadable and/or streaming, rented and/or purchased. In some instances, a content provider and a service provider may be separate. In some instances, a single provider may provide both content and services. For example, an entity that functions as a network access service provider may also provide content and/or services other than network access and, thus, that entity may also be accurately referred to as a "content provider" and/or a "service provider." Content and/or services that are provided by a content provider 130 and/or a service provider 120 may be provided to the gateway 102 via a physical layer connection provided by a network access service provider 120.

The plurality of distribution networks 110 may comprise one or more networks that may be operable to enable wireless, optical, and/or wired communication among a plurality of entities based on one or more networking and/or communication infrastructures. In this regard, the plurality of distribution networks 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 702.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices 104 which may be serviced and/or managed by the broadband gateway 102. In this regard, the location may be a residence (e.g., home, apartment), a small business, a school, a library, and/or other like settings in which users may want to obtain access to service and/or to content provider networks. The broadband gateway 102 may be utilized in the home network 100a to provide connectivity between the home network 100a and the service providers 120 (and/or the content providers 130) via the distribution networks 110.

The broadband gateway 102 may comprise suitable logic, circuitry, interfaces, and/or code that may be operable to provide connectivity between one or more devices in a home network, such as the home network 100a, and a plurality of external networks. For example, the broadband gateway 102 may handle a plurality of broadband physical layer connections 108 to the distribution networks 110. The broadband physical layer connections 108 may comprise wired, optical, and/or wireless connections between the broadband gateway 102 and the distribution networks 110. The broadband gateway 102 may operate as an interface device that may allow one or more service and/or content providers to interact with various devices in the home network. In this regard, the broadband gateway 102 may be operable to perform and/or provide various services that may pertain to enabling and/or facilitating reception of content from one or more content providers, wherein the content may be delivered through one or more services providers. For example, the broadband gateway 102 may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102 may communicate with various devices in the home network 100, using wired and/or wireless communication links.

A single gateway 102 may be operable to handle multiple physical layer (i.e., layer 1 of the open-systems interconnection model (OSI)) connections 108 to multiple ones, or portions, of the distribution networks 110, where different ones or portions of the distribution network(s) 110 are owned, operated, leased, or otherwise associated with different network access service providers 120. For example, a first network access service provider 120 may provide network access to the gateway 102 via a DSL connection over twisted-pair cabling, and a second network access service provider 120 may provide network access to the gateway 102 via a cable television connection over coaxial cabling. In some instances, the gateway 102 may be operable to concurrently communicate over multiple physical layer connections 108 provided by multiple network access service providers 120.

The broadband gateway 102 may also be operable to provide and/or support various other, non-content related services in the home network 100. For example, the broadband gateway 102 may be operable to provide energy management in the home network 100a, by controlling and/or adjusting configuration of one or more devices in the home network to reduce power consumption for example.

Devices serviced by, and/or communicatively coupled with the broadband gateway 102 may comprise content consuming devices and/or other, non-content consuming household or home devices that may be operable to interact with the broadband gateway 102. For example, the broadband gateway 102 may service, and/or may communicate with a plurality of home devices 104a-104m in the home network 100a. The devices 104a-104m may each be referred to as a communication device or an electronic device. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, a phone 104h, an appliance 104i (e.g., refrigerator), a digital video recorder (DVR) or personal video recorder (PVR) 104j, a thermostat or other environmental control(s) 104k, a power strip 104l, and lighting systems and/or controls 104m.

The broadband gateway 102 may interact with each of the home devices 104a-104m via links 106a-106m, which may be supported by the broadband gateway 102 and the corresponding home device. For example, the link 106a between the broadband gateway 102 and the television 104a may comprise a High-Definition Multimedia Interface (HDMI) cable. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102. The link 106h may comprise, for example, a phone line. The link 106i may comprise, for example, a wired or wireless Ethernet link. The link 106j may comprise, for example, a wired or a wireless link. The link 106k may comprise, for example, a wired or wireless link. The link 106m may comprise, for example, a wired or wireless link.

The power strip 104l may comprise one or more outlets and may comprise one or more plugs or other means of connecting to a power supply, such as a wall outlet. The power strip 104l may comprise suitable logic, circuitry, interfaces, and/or code that may be operable to measure and/or monitor energy consumed via one or more of its outlets, enable and disable consumption of power via one or more of its outlets, and/or limit current drawn via one or more if its outlets. The power strip 104l may be operable to communicate energy measurements via the link 106l. Also, enabling, disabling, limiting, or otherwise controlling power consumed via one or more outlets of the power strip 104l may be performed in response to messages received via the link 106l. The link 106l may comprise a wired or wireless link. The power strip 106l may be operable to communicate with the gateway 102 utilizing power line communication. For example, the gateway 102 may be plugged into an outlet of the power strip 106l and communicate with the gateway 102 via that outlet, or the gateway 102 and the power strip 104l may each be plugged into a common power distribution system.

As illustrated in FIG. 1, a plurality of home networks 100b, . . . , 100n, may also be connected to the distribution networks 110. These home networks 100b, . . . , 100n may operate in substantially the same manner as the home network 100a. By having multiple home networks connected to the distribution networks 110, various applications, such as peer-to-peer communication and/or data aggregation operations may be possible by utilizing the broadband gateways 102 in the home networks.

In operation, for particular content that is to be delivered from a provider 120 and/or 130 to a device 104, the gateway 102 may be operable to discover various options for obtaining the particular content. The gateway 102 may be operable to rank the available options and select the highest-ranking option.

In an embodiment of the invention, different options for obtaining particular content may be characterized by, for example, different prices, different power requirements, different providers, different versions or quality of the content, and/or different times at which the content is available. For example, a search performed by the gateway 102 may discover two options available for viewing "TV show." The first option may enable streaming a lower-quality version of "TV show" from a first provider at a first price, and a second option may provide for waiting a day and downloading a higher-quality version of "TV show" from a second provider at a second price. The gateway 102 may rank the options based on the characteristics of the options. Although five characteristics are described for illustration, the invention is not limited to any particular characteristics or number of characteristics.

In an embodiment of the invention, the options for receiving particular content may be ranked based on how well their characteristics fit with user-specified criteria. For example, a user may specify that he wants the highest-quality version of content that is available regardless of cost, time of delivery, or provider. Quality may refer to, for example, resolution, frame rate, 2-D video vs. 3-D video, frame loss, and/or compression level. Accordingly, the gateway 102 may, for example, rank the options from highest quality of the content to lowest quality of the content. For another example, a user may specify that he is willing to pay up to $X for the content if he can acquire the content within 24 hours otherwise he is only willing to pay up to $Y. Accordingly, the gateway 102 may, for example, sort the content options by time of availability and then rank, by price, those options that are available within the next 24 hours. These examples of user-specified criteria are only examples for illustration. In practice, a user could specify any qualitative and/or quantitative value, or range of values, for the criteria by which the content options are ranked.

In an embodiment of the invention, the options for receiving particular content may be ranked based on how well the characteristics of the options fit with the attributes and/or capabilities of a device or devices 104 via which the content will be consumed. For example, in instances that content is to be delivered to a home theater with a high-definition display and surround sound, the gateway 102 may, for example, rank the options from highest quality content to lowest quality content. Conversely, in instances that content is to be delivered to a handheld device, the gateway 102 may sort the content options by resolution and then, for the content options matching the resolution of the handheld device, sort them by cost and/or time of availability.

In some instances, the selected option may provide for pay-as-you-go, or per-download, or per-access payment. In such instances, the gateway 102 may pay for the content and then download or stream the content.

In some instances, the selected option may be from a subscription-based provider. In such instances, the gateway 102 may be operable to negotiate and/or enter into an agreement, a "micro-lease," that provides for a subscription that is limited in scope and/or duration relative to the subscriptions that the provider usually offers. In an embodiment of the invention, micro-leases may be utilized in lieu of, and/or in conjunction with service level agreements (SLAs) to enable controlling and/or modifying service performance parameters based on actual needs and/or requirements. In this regard, a SLA may comprise a fixed, non-adjustable service contract with long duration, such as one or more years, whereas a micro-lease may comprise a dynamically established service contract, for much shorter durations, such as on hourly, daily, or weekly basis, with negotiable performance requirements, such as latency and/or quality of service, which are only applicable to these shorter durations. Accordingly, instead of being bound by a long standing SLA, which is configured in a fixed manner based on, and/or guaranteeing maximum possible performance requirements, subscribers may configure and/or utilize micro-leases only when services are actually needed, for only the actually required duration, and/or only based on actually needed performance requirements. Accordingly, the broadband gateway 102 may configure different micro-leases for the managed services based on determined actual needs and/or limitations. In this regard, the broadband gateway 102 may establish the micro-leases based on negotiating with the service providers. The negotiations may apply to such parameters as transmission bitrates, time of delivery, and/or quality of service, and/or apportionment and/or characteristics of content in instances where the request may comprise obtaining content. For example, a cable television provider may typically provide content on a monthly or yearly subscription basis, but the gateway 102 may be operable to negotiate a micro-lease for shorter amount of time and/or for specific content.

Figure 2A:
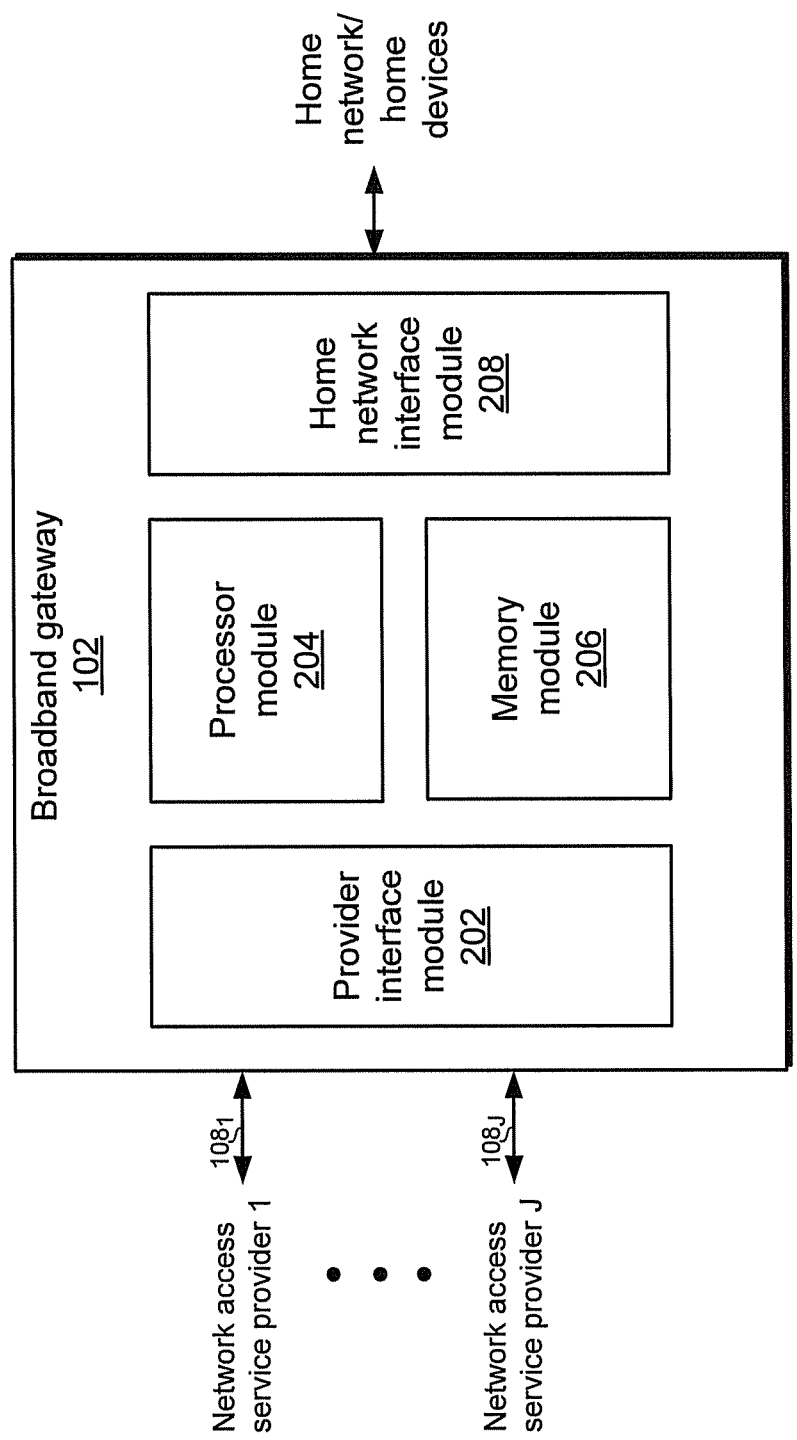
FIG. 2A is a block diagram illustrating an exemplary broadband gateway, in accordance with an embodiment of the invention.

FIG. 2A is a block diagram illustrating an exemplary broadband gateway, in accordance with an embodiment of the invention. Referring to FIG. 2A, the broadband gateway 102 may comprise suitable logic, circuitry, code, and/or interfaces that may be operable to provide connectivity between one or more networks, such as the distribution networks 110 shown in FIG. 1, for example, and one or more devices in a home network, such as the home devices 104a-104j in the home network 100a shown in FIG. 1. In this regard, the broadband gateway 102 may operate as an interface device that allows one or more devices in the home network to access one or more networks, and to access various services and/or content via those one or more networks. For example, the broadband gateway 102 may be utilized to enable interaction between the plurality of service providers 120 and/or the plurality of content providers 130, and the home devices 104a-104j.

The broadband gateway 102 may communicate with the various devices via a home network that may comprise wired, optical, and/or wireless communication links, such as the home network 100a. In this regard, the broadband gateway 102 may comprise suitable hardware and/or software to provide some or all of the functions and/or operations of one or more of a modem, a router, and a switch. The modem functions and/or operations may be those of a digital subscribed line (DSL) modem, a cable modem, and/or a wireless cable modem, for example. The router functions and/or operations may be those of a wireless router, for example. The switch functions and/or operations may be those of a network switch, or a local area network (LAN) switch, for example. In some instances, the broadband gateway 102 may communicate with the various devices in the home via more than one home network.

The broadband gateway 102 may comprise one or more modules. Each of these modules may comprise hardware, software, or a combination thereof that may be utilized to perform various operations associated with the broadband gateway 102. In an embodiment of the invention, the broadband gateway 102 may comprise a provider interface module 202, a processor module 204, a memory module 206, and a client network interface module 208. In some instances, the broadband gateway 102 may be such that the various modules listed above may be distributed over multiple devices. Moreover, the modules listed above are provided by way of illustration and not of limitation. Other configurations and/or architectures of the broadband gateway 102 may also be implemented. For example, the broadband gateway 102 may be a virtual gateway that is setup in a network by utilizing virtual machines (VMs) and/or next-generation (NG) data centers.

The provider interface module 202 may comprise suitable logic, circuitry, code, and/or interfaces that may be operable to receive data from and/or send data to one or more service/content providers via one or more physical layer connections 108 to one or more network access service providers. In this regard, each of the physical layer connections $108_1$-$108_j$ may connect the gateway 110 to a different network access service provider. Each of the physical layer connections 108 may comprise a wired, optical, or wireless connection. Each of the physical layer connections 108 may utilize different physical media and/or different physical layer protocols. For example, the connection $108_1$ may comprise a DSL over twisted-pair connection and the connection $108_j$ may comprise a CATV over coaxial cable connection.

The processor module 204 may comprise suitable logic, circuitry, code, and/or interfaces that may be operable to process data received from the service/content providers and/or data received from one or more devices 104 in the home. Data from one or more devices 104 may comprise user input such as feedback regarding consumed content and responses to questionnaires, surveys, and polls. Data received from the service/content providers via one or more the physical layer connections $108_1$-$108_j$ may be processed to make it suitable for communication to a device 108 and data from the one or more devices 104 may be processed to make it suitable for communication to the service/content providers via one or more the physical layer connections $108_1$-$108_j$. In this regard, the processor module 124 may comprise one or more portions that are suitable to handle certain types of data such as video data and/or audio data, for example.

The processor module 204 may also be operable to generate a graphical user interface (GUI) which may be manipulated via which a user may provide input. The GUI may be displayed as part of an OSD on a local device 104, such as a monitor or television, and may be manipulated via a remote control and/or other input device that communicates directly with the gateway 102. The GUI may be a web-based interface, and a user may interact with it via a computer and web browser. The GUI may be customized based on characteristics of the gateway 102, the device 104 coupled to the gateway, and the service and/or content providers associated with the gateway 102. The processors module 124 may utilize the memory 206 in performing its functions.

The memory module 206 may comprise suitable logic, circuitry, code, and/or interfaces that may be operable to store data utilized in the operations of the broadband gateway 102. For example, the memory module 206 may be utilized to store configuration data, parameters, device information, tracking and/or monitoring information, security information, and intermediate processing data, for example. The memory module 206 may comprise storage media, such as a hard drive, that may be integrated in the broadband gateway 102 and/or may be removable such as a removable storage device.

The client network interface module 208 may comprise suitable logic, circuitry, code, and/or interfaces that may be operable to receive data from and/or send data to one or more devices in the home network. The client network interface module 208 may be operable to support multiple communication protocols, standards, and/or data transport technologies. In this regard, the client network interface module 208 may handle one or more physical layer connections to one or more devices 104. For example, the client network interface module 208 may comprise, one or more wired and/or wireless Ethernet interfaces, one or more analog and/or digital audio outputs, one or more audio/video interfaces such as such as HDMI and DisplayPort, one or more USB interfaces, one or more IEEE 1394, and/or one or more telephone jacks.

The broadband gateway 102 may be operable to provide energy management by varying the configuration of one or more devices in the home network. The broadband gateway 102 may collect and/or store energy-related information of the devices in the home network and/or of the links in the home network, and may utilize such information to control the operation of the home devices. For example, the broadband gateway 102 may utilize channel capacity flexibility and content coding options to minimize and/or optimize power utilization. The broadband gateway 102 may also configure and/or manage the configuration of the network between the broadband gateway 102 and one or more service/content providers based on the energy-related information associated with the devices in the home. For example, at least a portion of the distribution networks 100 may be configured and/or managed in this manner.

The broadband gateway 102 may be utilized to display energy-related metrics, including consumption trends and/or costs, for example, and to display any available credits/rewards that may be redeemed by an account holder. In some instances, when a device in the home network is a certified device, such as a California efficient display, for example, the broadband gateway 102 may be utilized to provide that information to a service/content provider and obtain rewards/credits associated with the use of such certified devices. Moreover, overall network power consumption may be managed by sharing information among multiple interconnected broadband gateways.

The broadband gateway 102 may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 102 may be utilized to reduce bandwidth and/or processing power consumption in the home network. The broadband gateway 200 may also support and/or use multi-transport processing, which may be performed sequentially, in parallel, and/or utilizing distributed processing.

The gateway functionality associated with a user, such as security features, preferences, applications, electronic programming guides (EPGs), and user profile, for example, may be ported from the broadband gateway 102 to one or more other broadband gateways 102 in other locations. In some instances, a visitor may be allowed access to their content outside their service/content provider service area by, for example, classifying the access level for different users and/or by providing limited access to content. Moreover, the broadband gateway 102 may allow multiple user interface software structures by, for example, standardizing an interface to service/content providers and devices in the home network.

The broadband gateway 102 may be operable to broker and/or arbitrate with service/content providers the consumption of certain services, such as music and video, for example. In some instances, the broadband gateway 102 may perform content search, transport discovery, ranking, and/or sorting. These operations may be performed based on content quality, price, quality-of-service (QOS), and network protocols supported by the devices in the home network, such as service level agreements (SLAs), for example.

Various emergency-related services in the home network may be supported by the broadband gateway 102, including allowing first responders to provide alerts to a select group of users by accessing the broadband gateway 102 via secure links provided by the service/content providers. For example, the broadband gateway 102 may enable an emergency service provider, such as those associated with the emergency service provider network 140 described above in FIG. 1, to access one or more devices in the home network.

For peer-to-peer communication, the broadband gateway 102 may be utilized to allow enhanced content sharing in a service/content provider network. In this regard, the broadband gateway 102 may be utilized to construct a directory service for peer-to-peer connectivity with friends and family, for example. The broadband gateway 102 may be utilized to provide incentives to users who engage in peer-to-peer communication through, for example, the distribution networks 110. Moreover, the broadband gateway 102 may be utilized to match the content coding to the service type being consumed by the user and to make the necessary allocations through the network with respect to peer-to-peer or conventional Internet programming or broadcast programming.

The broadband gateway 102 may be utilized in connection with constrained network resources, such as time of day, traffic congestion, and the like, for example, to provide incentives for a user to accept a lower cost, lower quality of service that is dynamically configured for current network conditions. In some instances, the broadband gateway 102 may allow enhanced low latency service delivery to client devices in a home network.

The broadband gateway 102 may be operable to run or execute an agent to extract content, rating, copyright, language, privacy rules, and automatically add user-generated content, for example. Such agent may be run or executed in connection with the processor module 204 of the broadband gateway 102, for example. In some instances, the broadband gateway 102 may be operable to provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 102.

The broadband gateway 102 may be operable to combine and/or blend multiple contents for use as single content in the home network. Such combination may be performed in one or more of the modules of the broadband gateway 102. For example, the broadband gateway 102 may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 102. Only when a user authorizes the transfer of the confidential data will such data be stored and/or aggregated. The broadband gateway 102 may be operable to create a trusted rating mechanism for content. The broadband gateway 102 may be secure against external threats that may be downloaded from outside the home network and may provide a secure domain distribution in the home network. Automated and secured billing and payment services may also be provided by the broadband gateway 102.

The broadband gateway 102 may be operable to utilize client or home device profile information to select layered video service(s) and/or transmission. Such information may be stored, at least temporarily, in the memory module 206 of the broadband gateway 102. In some instances, the programming and/or enhanced video layers received by the broadband gateway 102 may be aggregated midstream by one or more network or routing nodes.

The broadband gateway 102 may support a reduction in the cost of unwatched content by using multi-tier billing for downloaded content, such as video content. The broadband gateway 102 may be utilized to provide a unified payment portal for collecting and/or aggregating charges from multiple service and/or content providers.

In operation, the gateway 102 may request and receive content from one or more providers via the provider interface module 202 and the one or more physical layer connections $108_1$-$108_J$. The content may be requested and received from a network access provider such as a cable or satellite company and/or may be requested from content provider such as YouTube, Hulu, or a broadcasting network and received via the physical layer connection(s) 108 provided by a network access service provider. In some instances, different options for receiving particular content may be available via different ones of the physical layer connections $108_1$-$108_J$. Content received via the interface 202 may be stored to the memory module 206 and/or to other local storage such as a digital video recorder (DVR) communicatively coupled to the interface 208. The processor module 204 may transcode and/or otherwise process content upon receiving it and/or upon outputting it to one or more devices 104 via the interface 208.

Upon determining that content is to be delivered to one or more devices 104 via the interface 208, the processor module 204 may trigger a search, via the interface 202, of available options for the content. Upon discovering the various options for receiving the content, the processor 204 may rank the options and select the highest-ranked option to acquire the content.

Figure 2B:
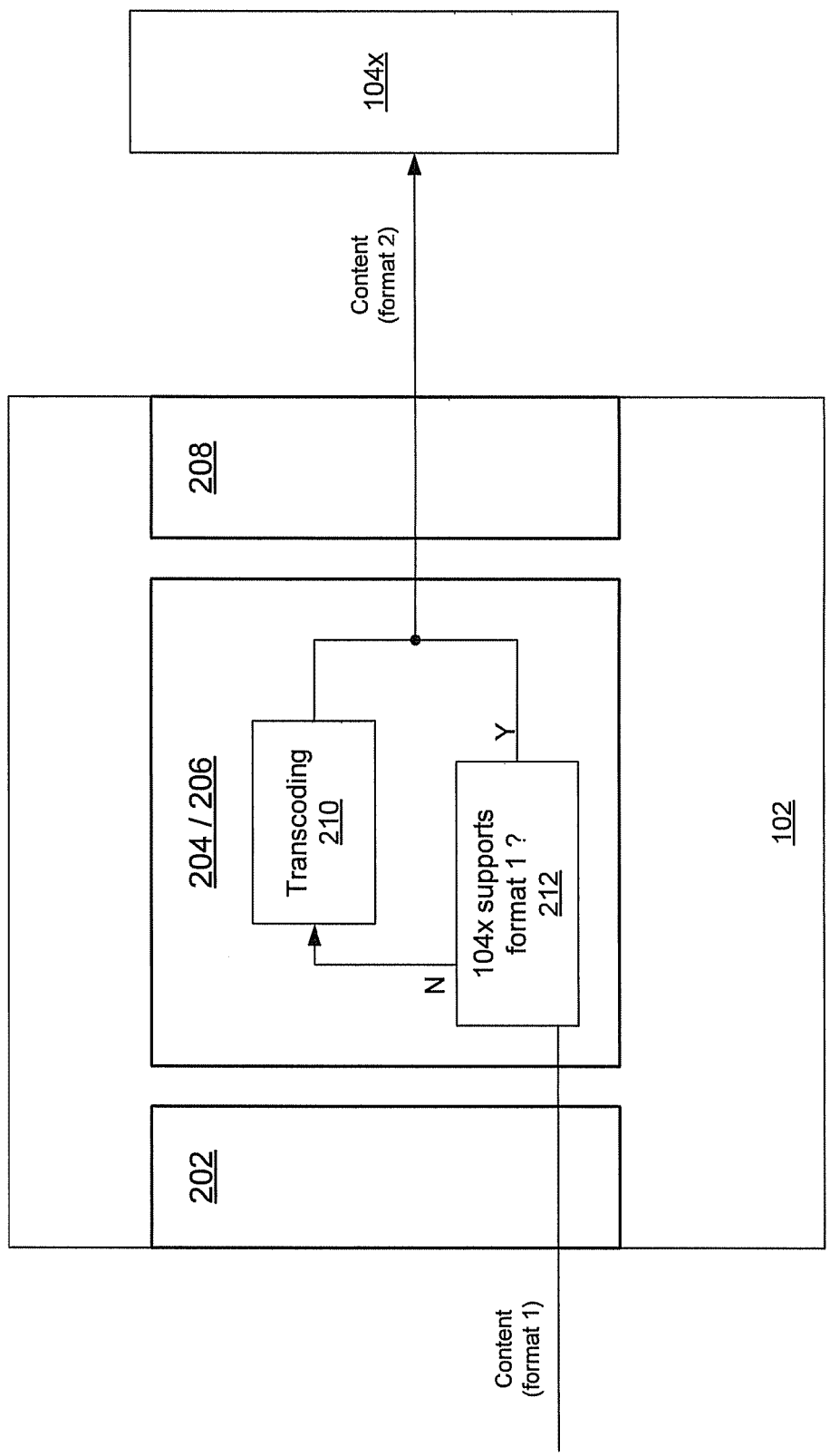
FIG. 2B is a block diagram illustrating an exemplary broadband gateway, in accordance with an embodiment of the invention.

FIG. 2B is a block diagram illustrating an exemplary broadband gateway, in accordance with an embodiment of the invention. Referring to FIG. 2B, there is shown the gateway 102 and a requesting device 104x. In FIG. 2B, a single block 204/206 represents the processor module 204 and the memory module 206 to indicate the interaction of the two modules for the performance of various aspects of the invention.

The module 212 may comprise suitable logic, circuitry, interfaces and/or code. The module 212 may be operable to determine a format of received content, determine which format or formats are supported by devices 104 to which content will be delivered, and determine whether the format of received content is one of the formats supported by the device 104x to which the content is destined.

The module 210 may comprise suitable logic, circuitry, interfaces, and/or of code that may be operable to transcode content from one format to another, where format refers to any attributes of the content such as, for example, resolution of video, color space, bit rate, frame rate, compression, and encoding. The transcoding may, for example, comprise compressing the acquired content, decompressing the acquired content, and/or a combination of decompressing and compressing the acquired content. The transcoding may comprise scaling a resolution of the acquired content. The transcoding may comprise, for example, decrypting, encrypting, and/or a combination of decrypting and encrypting.

In operation, content formatted into format 1 may be received via the module 202 and conveyed to the block 204/206. The module 212 may determine that the content is destined for device 104x, and determine whether device 104x supports format 1. In instances that the device 104x does support format 1, the content may be conveyed to the module 208 and communicated to the device 104x. Conversely, the module 212 may determine that the device 104x does not support format 1 but supports format 2. Accordingly, the module 212 may convey the content to the module 210 and indicate to the module 210 that the device 104x supports format 2. As a result, the module 210 may transcode the content to format 2 and then convey the transcoded content to the module 208 for communication to the device 104x.

Figure 3:
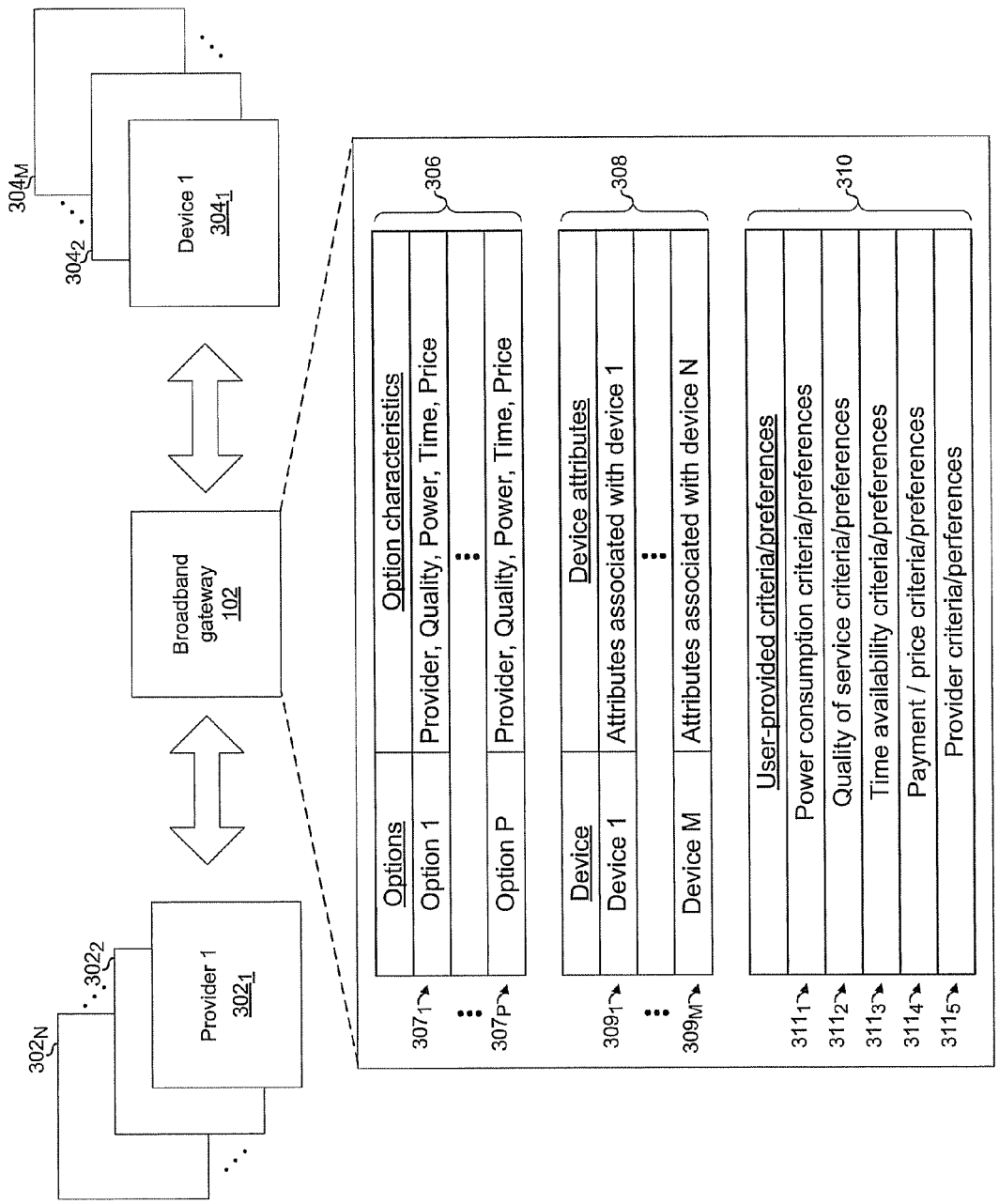
FIG. 3 is diagram illustrating a broadband gateway operable to customize delivery of content, in accordance with an embodiment of the invention.

FIG. 3 is diagram illustrating a broadband gateway operable to customize delivery of content, in accordance with an embodiment of the invention. Referring to FIG. 3 there is shown a plurality of providers $302_1$-$302_N$, the broadband gateway 102, and a plurality of devices $304_1$-$304_N$, where N is any positive integer and M is any positive integer. Each of the providers $302_1$-$302_N$ may be substantially similar to a service provider 120 and/or a content provider 130 described with respect to FIGS. 1 and 2. Each of the devices may be substantially similar to one of the devices 104a-104m described with respect to FIG. 1.

In operation, upon determining that particular content is to be delivered to a device 304, the gateway 102 may search out options for acquiring the particular content. The gateway 102 may query, for example, a search engine and/or send individual queries to each of one or more providers $302_1$-$302_N$. The discovered options for acquiring the particular content may be stored in a table 306 with each of the entries $307_1$-$307_P$, where P is any positive integer, corresponding to a different option. Each entry $307_p$, where p is an integer between 1 and P, may store characteristics of the corresponding option. In an embodiment of the invention, each entry $307_p$ may comprise a field that indicates the provider associated with the option, a field that indicates quality of service associated with the option, a field that indicates power consumption associated with the option, a field that indicates when the option is available, and a field that indicates the price of the option.

The gateway 102 may also discover the devices $304_1$-$304_M$, where M is any positive integer, to which it is communicatively coupled and the attributes of those devices. The attributes may be stored in a table 308 with each entry $309_m$, where m is an integer between 1 and M, comprising the attributes of the corresponding device $302_m$. Attributes of the devices may comprise, for example, display resolution, number of audio channels supported, supported encoding and decoding techniques, bandwidth of a connection between the device and the gateway 102, and whether the device is operating on battery power and/or in a low power mode.

The gateway 102 may also store a table 310 of user criteria for ranking and selecting content options. In an embodiment of the invention, the table 310 may comprise an entry $311_1$ which comprises power consumption criteria. Power consumption criteria may indicate, for example, whether saving power is important in deciding between options for receiving particular content. In an embodiment of the invention, the table 310 may comprise an entry $311_2$ which comprises quality of service (QoS) criteria. Quality of service criteria may indicate, for example, latency that is acceptable and/or error rates that are acceptable. Exemplary error rates may comprise bit error rates, packet error rates and/or frame error rates. In an embodiment of the invention, the table 310 may comprise an entry 311$_3$ which comprises criteria that indicates when content may be available. Availability criteria may indicate, for example, whether the content is desired as soon as possible or whether the user is willing to wait in order to get a lower price. In an embodiment of the invention, the table 310 may comprise an entry 311$_4$ which comprises criteria for the price of content. Pricing criteria may indicate, for example, how much the user is willing to pay for particular content or types of content. In an embodiment of the invention, the table 310 may comprise an entry 311$_5$ which comprises criteria for which providers are utilized for obtaining content. Provider criteria may indicate, for example, a user's preferred provider(s).

Figure 4:
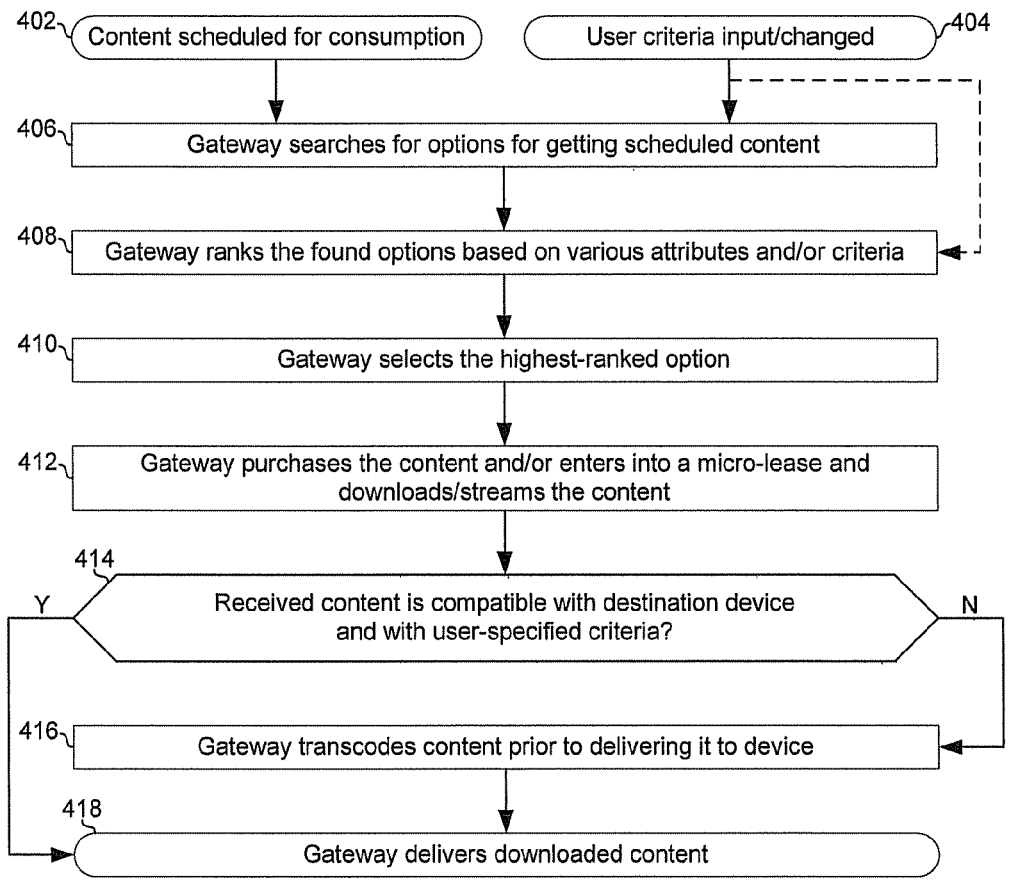
FIG. 4 is flowchart illustrating exemplary steps for customized acquisition and delivery of content, in accordance with an embodiment of the invention.

FIG. 4 is flowchart illustrating exemplary steps for customized delivery of content, in accordance with an embodiment of the invention. Referring to FIG. 4, the exemplary steps begin with either step 402 or step 404. In step 402, content may be scheduled for consumption by a device 304 via the gateway 102. For example, a user may set the gateway 102 to record a television show or tune to a channel at the start of the television show.

In step 404, a user may enter and/or update criteria for ranking and selecting content options. Subsequent to step 404, the exemplary steps may advance to step 406 or to step 408 depending on various circumstances such as what the previous criteria were, what the new criteria are, and what content is scheduled for delivery via the gateway 102.

In step 406, the gateway 102 may search for options to receive scheduled content. The search may comprise, for example, querying various providers and/or a search engine designed to search for content provided via not only public networks such as the Internet, but also private networks such as cable television or satellite networks. In an embodiment of the invention, a first one or more options may be discovered via a first physical layer connection 108$_1$ and one or more options may be discovered via a second physical layer connection 108$_2$. For example, the first physical layer connection 108$_1$ may be a DSL connection to the Internet and the second physical layer connection 108$_2$ may be a DOCSIS connection to a cable provider. Accordingly, the gateway 102 may discover the content available via the Internet and may discover the content available from the cable provider.

In step 408, the gateway 102 may rank the content options that were discovered in step 406. An exemplary ranking technique is described with regard to FIG. 7 below. In step 410, the gateway 102 may select the highest-ranked content option. In step 412, the gateway 102 may receive the content in accordance with the selected option. In step 414, the gateway 102 may determine whether the received content is compatible with the device(s) 304 to which it is to be delivered and whether the receive. For example, whether the encoding, compression, and/or resolution of the content is supported by the destination device(s) 304.

Additionally or alternatively, in step 414, the gateway may determine whether the received content is compatible with user-specified criteria. For example, the content may have been downloaded based on a first set of criteria but the criteria may have since changed. As a result, the content may be transcoded to make it compatible, or more compatible, with the newer criteria. In an embodiment of the invention, the content may be transcoded to meet quality criteria. For example, the resolution, frame rate, and/or amount of compression may be adjusted to meet user-specified criteria. In an embodiment of the invention, the content may be transcoded to meet power consumption criteria. For example, the content may be transcoded into a format that requires less energy to deliver over a network and/or to present on a device 304.

In instances that the received content is not compatible with the destination device(s) 304 and/or the user-specified criteria, the exemplary steps may advance to step 416 and the gateway 102 may transcode, reformat, and/or otherwise process the content to make it compatible or otherwise suitable for processing and/or consumption by the destination device(s) 304. For example, the resolution of the content may be scaled, have its frame rate adjusted, compressed, decompressed, decoded, and/or encoded. In instances that the received content is compatible with the destination device(s) 304 and the user-specified criteria, the exemplary steps may skip step 416 and advance to step 418. In step 418, the gateway 102 may deliver the content to the destination device(s) 304.

Figure 5:
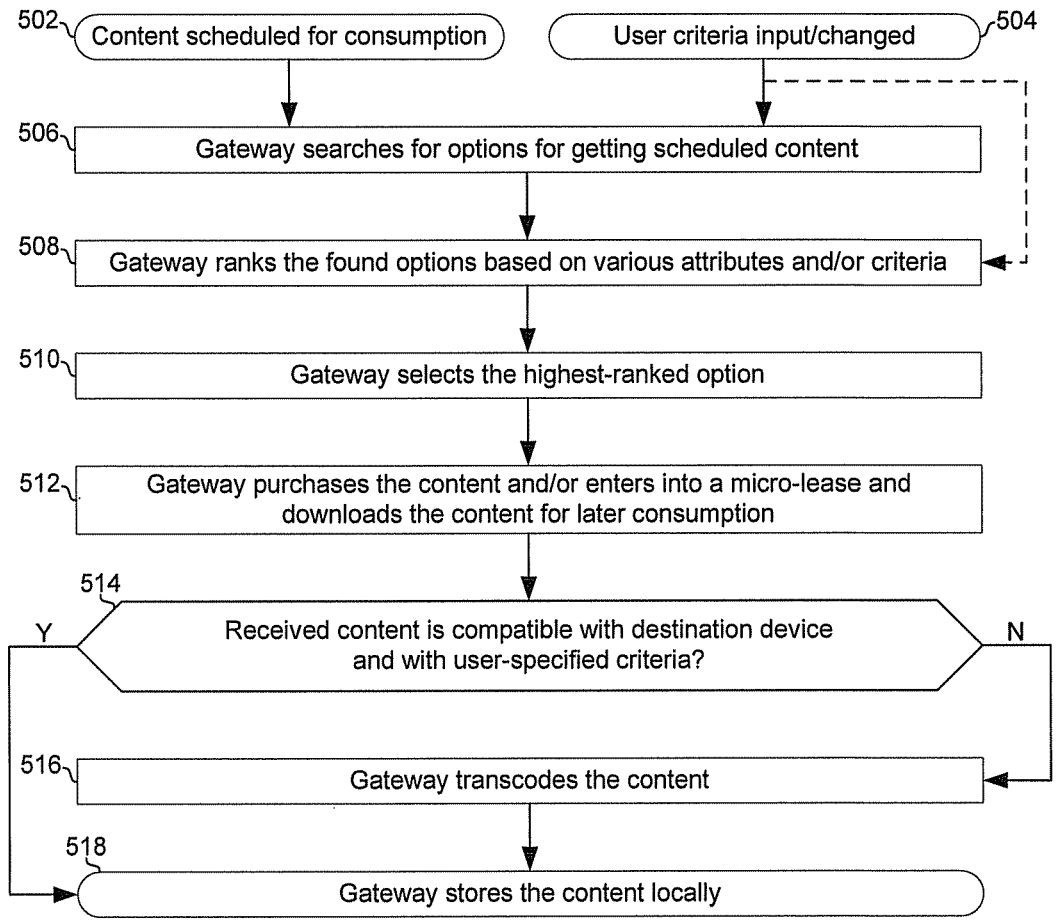
FIG. 5 is flowchart illustrating exemplary steps for customized acquisition and delivery of content, in accordance with an embodiment of the invention.

FIG. 5 is flowchart illustrating exemplary steps for customized delivery of content, in accordance with an embodiment of the invention. Referring to FIG. 5 the steps 502-510 are the same as steps 402-410, respectively. In step 512, the gateway 102 may download the content for later consumption. That is, the content may be downloaded prior to the time at which it is scheduled for consumption. Accordingly, the content may need to be stored locally in the gateway 102 and/or a storage device coupled to the gateway 102. In step 514, the gateway 102 may determine whether the content as received is compatible with the device(s) 304 via which it will be consumed. Additionally or alternatively, in step 514, the gateway may determine whether the received content is compatible with user-specified criteria. For example, the content may have been downloaded based on a first set of criteria but the criteria may have since changed. As a result, the content may be transcoded to make it compatible, or more compatible, with the newer criteria. In instances that the content is not compatible with the destination device(s) 304 and/or the user-specified criteria, then in step 516 the gateway 102 may transcode, reformat, and/or otherwise process the content as it is received prior to storing it. By transcoding and/or reformatting the content prior to downloading it, storage space may be conserved in instances that the transcoded and/or reformatted content is smaller. In step 518, the gateway 102 may store the content to local memory and/or to a storage device, such as a digital video recorder, that is communicatively coupled to the gateway 102.

Figure 6:
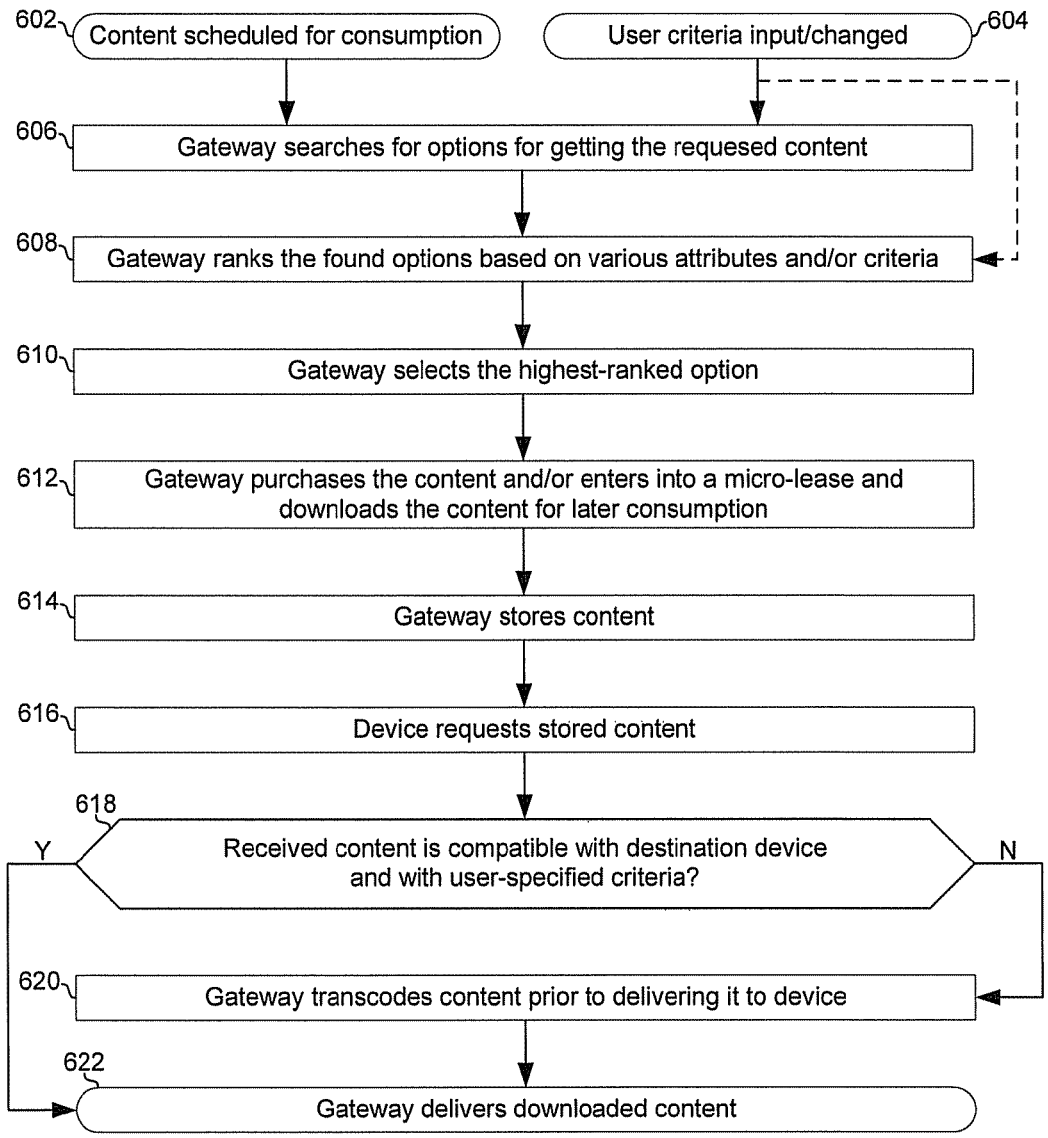
FIG. 6 is flowchart illustrating exemplary steps for customized acquisition and delivery of content, in accordance with an embodiment of the invention.

FIG. 6 is flowchart illustrating exemplary steps for customized delivery of content, in accordance with an embodiment of the invention. Referring to FIG. 6, the steps 602-612 are the same as steps 502-512, respectively. In step 614, the downloaded content may be stored locally in the gateway 102 and/or in a storage device communicatively coupled to the gateway 102. In step 616, a device 304 may request the content from storage. In step 618, the gateway 102 may determine whether the stored content is compatible with the device(s) 304 requesting it. Additionally or alternatively, in step 618, the gateway may determine whether the received content is compatible with user-specified criteria. For example, the content may have been downloaded based on a first set of criteria but the criteria may have since changed. As a result, the content may be transcoded to make it compatible or suitable, with the newer criteria. In instances that the received content is not compatible with the requesting device 304 and/or the user-specified criteria, the exemplary steps may advance to step 620, and the gateway 102 may transcode, reformat, and/or otherwise process the content to make it suitable for the requesting device 304. In instances that the received content is compatible with the requesting device 304, the exemplary steps may skip step 620 and advance to step 622. In step 622, the gateway 102 may deliver the content to the requesting device 304.

Figure 7:
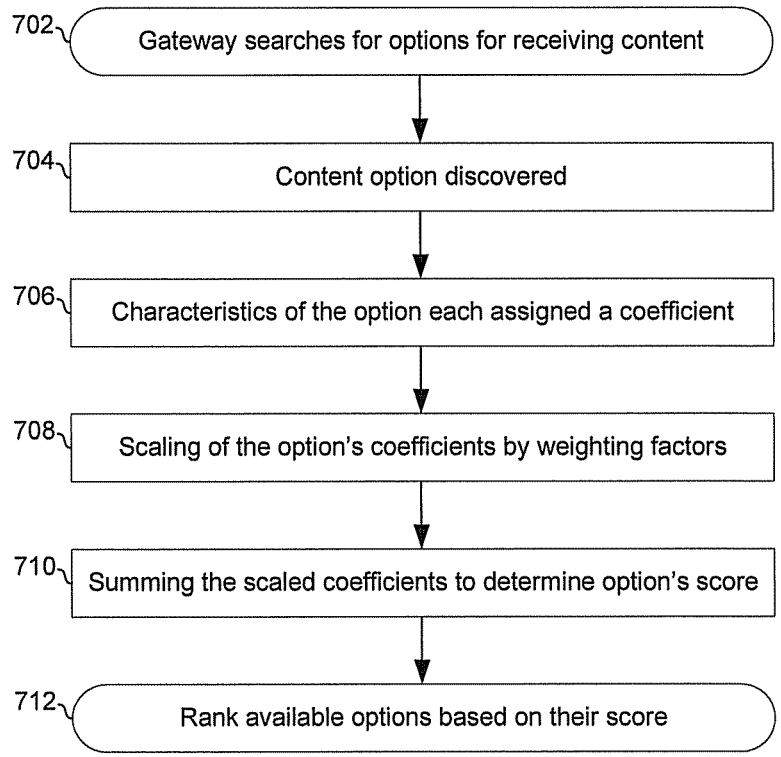
FIG. 7 is a flowchart illustrating exemplary steps for ranking content options, in accordance with an embodiment of the invention.

FIG. 7 is a flowchart illustrating exemplary steps for ranking content options, in accordance with an embodiment of the invention. Referring to FIG. 8, the exemplary steps may begin with step 702, when the gateway 102 begins searching for available options for receiving particular content. In step 704, the gateway 102 may discover an option for receiving the particular content, and may determine characteristics of the discovered option. For example, the gateway may determine the quality of the content associated with the option, the times that the option is available, the price of the option, the provider associated with the option, and/or power consumption required for obtaining the content utilizing the option.

In step 706, the gateway 102 may assign one or more coefficients to one or more of the characteristics of the content option. In an embodiment of the invention, the option may be assigned a quality coefficient, a time coefficient, a price coefficient, a provider coefficient, and power coefficient.

In step 708, the gateway 102 may weight, that is, scale or adjust, the plurality of assigned coefficients by a corresponding plurality of weighting factors. The weighting factors may be determined based on, for example, user-specified criteria and/or on the attributes of the devices to which the content is to be delivered. Accordingly, the weighting factors may change as the user criteria and/or device attributes change. Furthermore, upon a change in one or more weighting factors, discovered options may be re-ranked. In an embodiment of the invention, the gateway 102 may determine a quality weighting factor, a time weighting factor, a price weighting factor, a provider weighting factor, and power weighting factor. For example, in instances that a user wants the lowest-cost option available, the price weighting factor may be set to a high value and the other weighting factors may be set to lower values. For another example, in instances that a device supports only standard-definition video, the quality weighting factor may be set to a low value and the other factors may be set to higher values.

In step 710, the weighted coefficients of the option may be summed together resulting in a score for the option. In step 712, the option and other options for the particular content may be ranked based on their respective scores.

Various aspects of a method and system for customized delivery of content by a broadband gateway are provided. In an exemplary embodiment of the invention, a broadband gateway 102 may be operable to determine one or more characteristics of acquired content. The gateway 102 may be operable to determine, based on the determined characteristics and based attributes of one or more electronic devices 304 that will be utilized for consuming the content, whether the acquired content may be compatible with the one or more electronic devices 304. In instances that the acquired content is not compatible with the one or more electronic devices 304, the gateway 102 may transcode the acquired content to make it compatible with the one or more electronic devices 304. The transcoding may comprise compressing the acquired content, decompressing the acquired content, and/or a combination of decompressing and compressing the acquired content. The transcoding may comprise scaling a resolution of the acquired content. The one or more characteristics may comprise a provider 120 and/or 130 associated with the acquired content, a quality of the acquired content, and/or power consumption associated with communicating the acquired content to a destination device 304, and/or power consumption associated with presenting or otherwise processing the acquired content on a destination device 104. The attributes may comprise a display resolution of the one or more devices 304, a decoding algorithm or technique supported by the one or more devices 304, and/or a bandwidth of a connection 106 between the one or more devices 304 and the broadband gateway 102.

The broadband gateway 102 may be operable to determine, based on the determined characteristics, whether the acquired content is compatible with user-specified criteria. In instances that the acquired content is not compatible with the user-specified criteria, the gateway 102 may be operable to transcode the acquired content to make it compatible with the user-specified criteria. The user-specified criteria may comprise one or more of: criteria for quality of the content and/or criteria for power consumption associated with communicating and consuming the content. The user-specified criteria may be stored in memory in the broadband gateway 102.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for customized delivery of content by a broadband gateway.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in a broadband gateway operable to handle at least one physical layer connection to at least one corresponding network access service provider:

searching for an option to acquire content with reference to at least one user-specified criteria or device attribute associated with one or more electronic devices;

acquiring content based on said option;

determining one or more characteristics of said acquired content;

determining, based on said one or more characteristics, whether said acquired content is compatible with said one or more electronic devices; and in instances that said acquired content is incompatible with said one or more electronic devices, transcoding said acquired content to be compatible with said one or more electronic devices.

2. The method according to claim 1, wherein:

said at least one physical layer connection comprises a plurality of physical layer connections; and searching for said option to acquire content comprises searching for options to acquire content among said plurality of physical layer connections and ranking said options based on said at least one user-specified criteria or device attribute.

3. The method according to claim 1, wherein said transcoding comprises at least one of compressing or decompressing said acquired content.

4. The method according to claim 1, wherein determining said one or more characteristics comprises determining one or more of an identity or a type of a provider associated with said acquired content, a quality of said acquired content, a power consumption associated with communicating said acquired content, or a power consumption associated with consuming said acquired content.

5. The method according to claim 1, wherein said device attribute comprises one or more of a display resolution of said one or more electronic devices, a decoding technique supported by said one or more electronic devices, or a bandwidth of a connection between said one or more electronic devices and said broadband gateway.

6. The method according to claim 1, wherein:

determining whether said acquired content is compatible comprises determining whether format of said acquired content is compatible with said at least one user-specified criteria or device attribute; and in instances that said format of said acquired content is incompatible with said at least one user-specified criteria or device attribute, transcoding said acquired content to a format that is compatible with said at least one user-specified criteria or device attribute.

7. The method according to claim 1, wherein said user-specified criteria comprises one or more of content reproduction quality criteria, content reproduction power consumption criteria, content reproduction time availability criteria, content price criteria, or content provider criteria.

8. The method according to claim 1, comprising storing a table of user-specified criteria and device attributes for a plurality of electronic devices in memory in said broadband gateway.

9. A system for networking, the system comprising:

at least one processor, circuit, or any combination thereof for use in a broadband gateway operable to handle at least one physical layer connection to at least one corresponding network access service provider, said at least one processor, circuit, or combination thereof being operable to:

search for an option to acquire content with reference to at least one user-specified criteria or device attribute associated with one or more electronic devices;

acquire content based on said option;

determine one or more characteristics of said acquired content;

determine, based on said one or more characteristics, whether said acquired content is compatible with said one or more electronic devices; and in instances that said acquired content is incompatible with said one or more electronic devices, transcode said acquired content to be compatible with said one or more electronic devices.

10. The system according to claim 9, wherein:

said at least one physical layer connection comprises a plurality of physical layer connections; and said at least one processor, circuit, or any combination thereof is further operable to search for options to acquire content among said plurality of physical layer connections and rank said options based on said at least one user-specified criteria or device attribute.

11. The system according to claim 9, wherein said at least one processor, circuit, or any combination thereof is further operable to at least one of compress or decompress said acquired content.

12. The system according to claim 9, wherein said one or more characteristics comprise one or more of an identity or a type of a provider associated with said acquired content, a quality of said acquired content, a power consumption associated with communicating said acquired content, or a power consumption associated with consuming said acquired content.

13. The system according to claim 9, wherein said device attribute comprises one or more of a display resolution of said one or more electronic devices, a decoding technique supported by said one or more electronic devices, or a bandwidth of a connection between said one or more electronic devices and said broadband gateway.

14. The system according to claim 9, wherein said at least one processor, circuit, or any combination thereof is further operable to:

determine whether a format of said acquired content is compatible with said user-specified criteria and said device attribute; and in instances that said format of said acquired content is incompatible with said at least one user-specified criteria or device attribute, transcode said acquired content to a format that is compatible with said at least one user-specified criteria or device attribute.

15. The system according to claim 9, wherein said user-specified criteria comprises one or more of content reproduction quality criteria, content reproduction power consumption criteria, content reproduction time availability criteria, content price criteria, or content provider criteria.

16. The system according to claim 9, wherein said at least one processor, circuit, or any combination thereof is further operable to store a table of user-specified criteria and device attributes for a plurality of electronic devices in memory in said broadband gateway.

17. A method, comprising:

searching, by a broadband gateway, for an option to acquire content with reference to at least one user-specified criteria or device attribute associated with an electronic device;

acquiring content based on said option;

determining whether said acquired content is compatible with said electronic device; and in instances that said acquired content is incompatible with said electronic device, transcoding said acquired content to be compatible with said one or more electronic devices.

18. The method according to claim 17, wherein searching for said option to acquire content comprises searching for options to acquire content among a plurality of physical layer connections and ranking said options based on said at least one user-specified criteria or device attribute.

19. The method according to claim 17, wherein:
- determining whether said acquired content is compatible comprises determining whether a format of said acquired content is compatible with said at least one user-specified criteria or said device attribute; and
- in response to said format of said acquired content being incompatible with said at least one user-specified criteria or device attribute, transcoding said acquired content to a format that is compatible with said at least one user-specified criteria or device attribute.

20. The method according to claim 17, comprising storing a table of user-specified criteria and device attributes for a plurality of electronic devices in memory in said broadband gateway.

\* \* \* \* \*